United States Patent
Fahim et al.

(10) Patent No.: US 7,325,879 B2
(45) Date of Patent: Feb. 5, 2008

(54) SEAT BELT GUIDE

(75) Inventors: Masroor Fahim, Canton, MI (US);
Todd Rupert Muck, Fowlerville, MI (US); Yi-Ru Chen, Ann Arbor, MI (US); Bill Deming, Fenton, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 0 days.

(21) Appl. No.: 11/549,163

(22) Filed: Oct. 13, 2006

(65) Prior Publication Data

US 2007/0182236 A1 Aug. 9, 2007

Related U.S. Application Data

(60) Provisional application No. 60/771,126, filed on Feb. 7, 2006.

(51) Int. Cl.
*B60R 22/00* (2006.01)

(52) U.S. Cl. ..................................... 297/473
(58) Field of Classification Search ............... 297/473, 297/483; 280/801.1, 808
See application file for complete search history.

(56) References Cited

U.S. PATENT DOCUMENTS

| | | | | |
|---|---|---|---|---|
| 5,340,198 A | * | 8/1994 | Murphy et al. | 297/483 |
| 5,733,004 A | * | 3/1998 | Celestina-Krevh et al. | 297/250.1 |
| 6,250,681 B1 | * | 6/2001 | Takahashi et al. | 280/805 |
| 6,726,287 B1 | * | 4/2004 | Janz | 297/483 |
| D519,404 S | * | 4/2006 | Berke et al. | D11/200 |

* cited by examiner

*Primary Examiner*—Milton Nelson, Jr.
(74) *Attorney, Agent, or Firm*—Gifford, Krass, Sprinkle, Anderson & Citkowski, P.C.

(57) ABSTRACT

A seat belt guide includes first and second walls each having opposite top and bottom ends. A pair of generally parallel end walls extends from the first wall. The end walls are spaced apart for retaining the seat belt in a transverse direction. A pair of generally parallel side walls extends from the second wall. The side walls are spaced apart for retaining the seat belt in the transverse direction. First and second lips protrude outwardly for maintaining the seat belt spaced apart from the second wall to minimize friction associated with sliding of the seat belt through the guide. A pair of retaining walls extends toward each other from the pair of side walls, the retaining walls being spaced apart from the second wall for retaining the seat belt therebetween.

14 Claims, 2 Drawing Sheets

SEAT BELT GUIDE

RELATED APPLICATION

This application claims priority of U.S. Provisional Patent Application Ser. No. 60/771,126 filed Feb. 7, 2006, entitled "Under Bezel Seatbelt Webbing Guide."

BACKGROUND OF THE INVENTION

1. Field of the Invention

The invention relates to an improved seat belt guide for routing a seat belt between a belt retractor and an occupant seated on a vehicle seat.

2. Description of the Related Art

Seat belts are used for restraining an occupant in a seat of an automotive vehicle. One end of the belt is coiled about a spool in a belt retractor and an opposite end of the belt is coupled to the vehicle seat. The retractor is usually continuously biased for coiling the belt onto the spool. The belt extends through a slot of a belt buckle, which may be releasably locked in a receiver for retaining the occupant in the seat. Typically, the belt is guided through a generally closed loop of a "D" ring mounted to a top of a backrest of the seat for maintaining the belt in a position easily accessible by the occupant.

To facilitate use of the seat belt, it is desirable to minimize the efforts associated with pulling the belt from the retractor. It is also desirable to prevent twisting of the belt as the belt is pulled from or returned to the retractor.

SUMMARY OF THE INVENTION

According to one aspect of the invention, a seat belt guide is provided for guiding a seat belt of a vehicle seat, which minimizes friction associated with sliding the belt through the guide and prevents twisting of the belt as it is pulled from or returned to the retractor. The seat belt guide includes first and second walls each having opposite top and bottom ends. A pair of generally parallel end walls extends from the first wall. The end walls are spaced apart for retaining the seat belt in a transverse direction. A pair of generally parallel side walls extends from the second wall. The side walls are spaced apart for retaining the seat belt in the transverse direction. A pair of retaining walls extends toward each other from the pair of side walls, the retaining walls being spaced apart from the second wall for retaining the seat belt therebetween. First and second lips protrude outwardly for maintaining the seat belt spaced apart from the second wall to minimize friction associated with sliding of the seat belt through the guide.

According to another aspect of the invention, a seat belt guide includes first and second walls each having opposite top and bottom ends. The bottom end of the first wall and the top end of the second wall are spaced apart to define an opening therebetween. A pair of generally parallel end walls extends from the first wall. The end walls are spaced apart for retaining the seat belt in a transverse direction. A pair of generally parallel side walls extends from the second wall. The side walls are spaced apart for retaining the seat belt in the transverse direction. A pair of retaining walls extends toward each other from the pair of side walls. The retaining walls are spaced apart from the second wall for retaining the seat belt therebetween. The retaining walls are positioned over the opening defined between the bottom end of the first wall and the top end of the second wall so as to minimize friction associated with the belt passing under the retaining walls.

BRIEF DESCRIPTION OF THE DRAWINGS

Advantages of the present invention will be readily appreciated as the same becomes better understood by reference to the following detailed description when considered in connection with the accompanying drawing, wherein.

DESCRIPTION OF THE INVENTION

The invention provides an improved seat belt guide for routing a seat belt between a belt retractor on a vehicle seat and an occupant seated on the vehicle seat.

Figure 1:
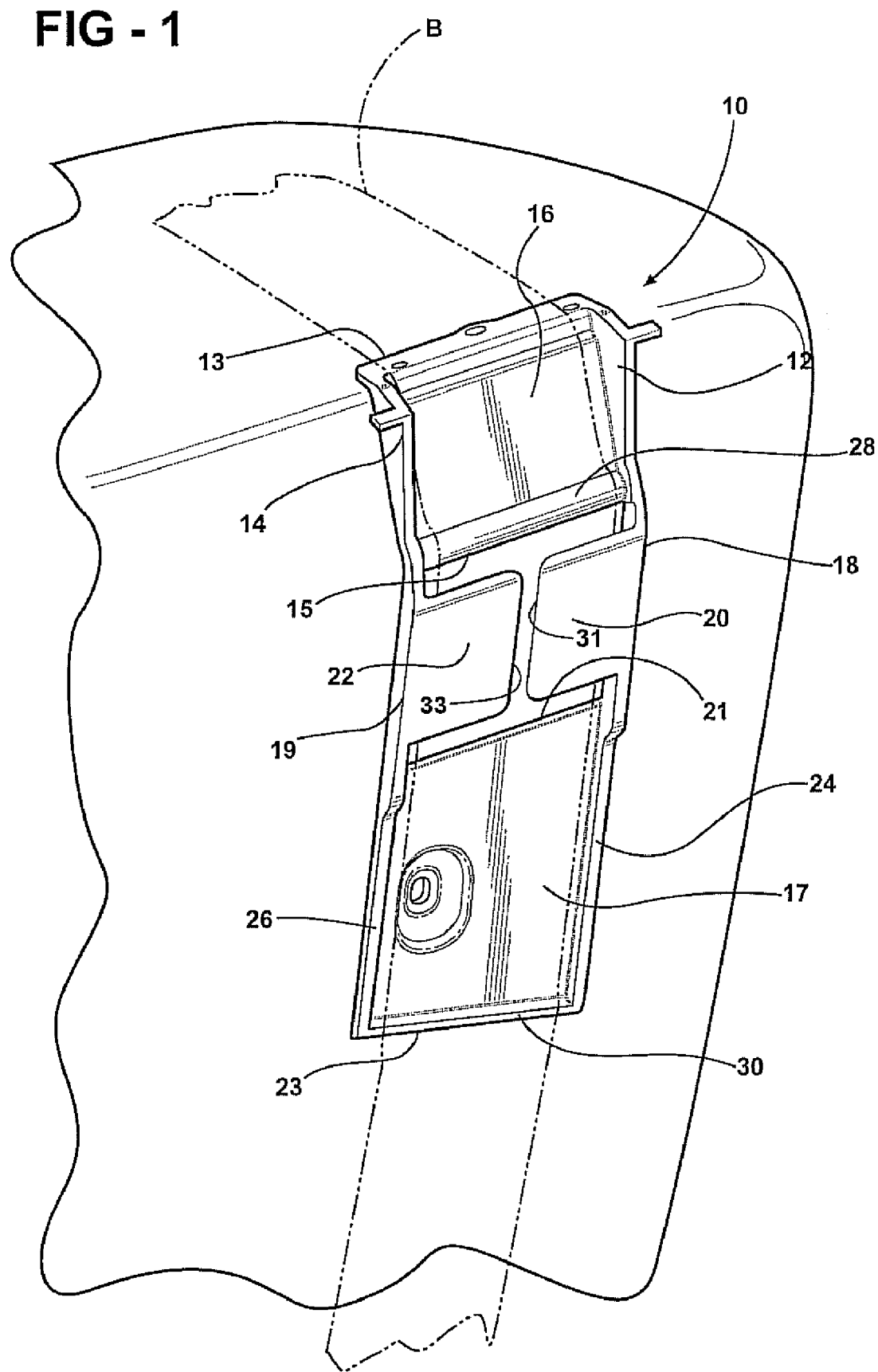
FIG. 1 is a perspective view of a seat belt guide according to one embodiment of the invention.
Figure 2:
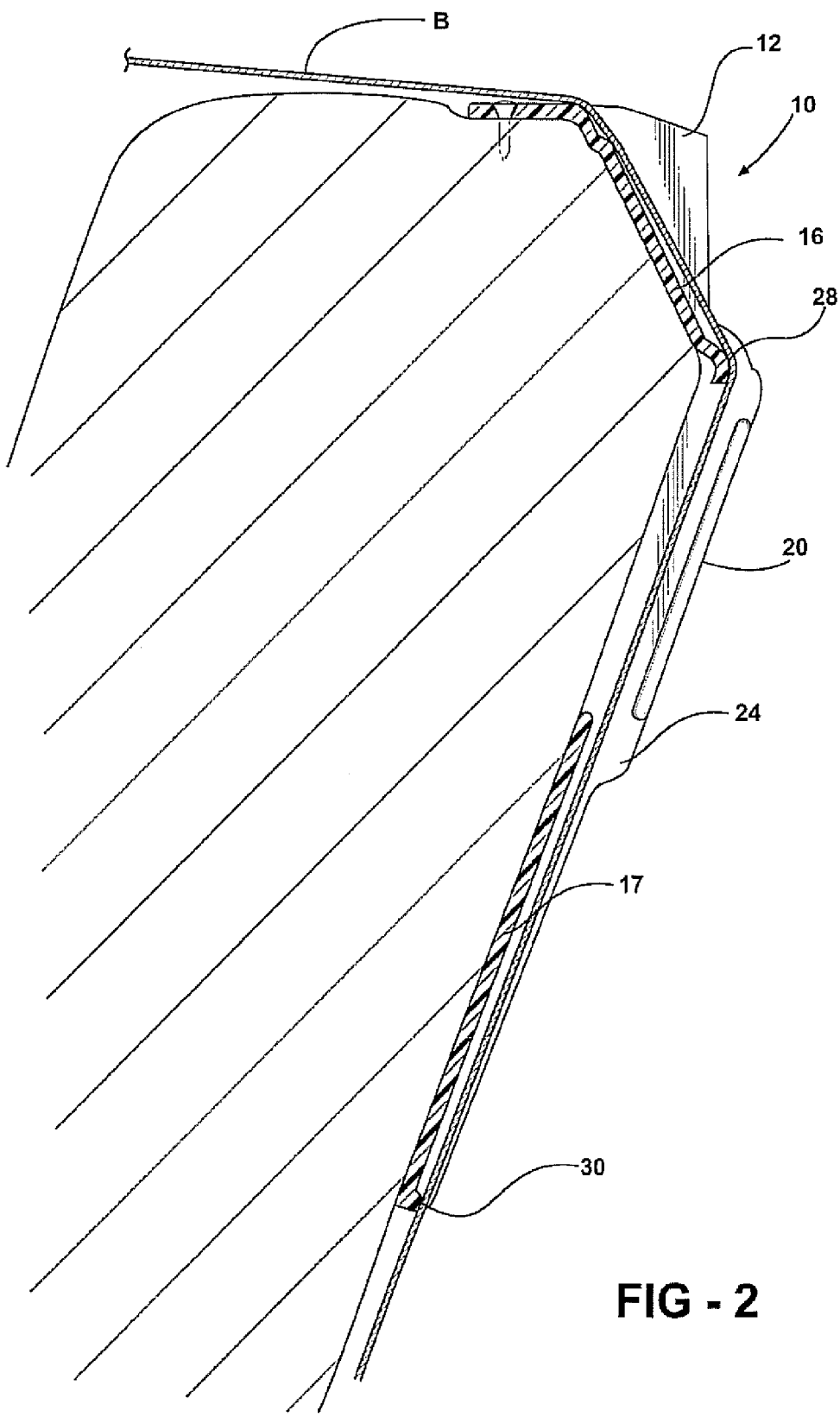
FIG. 2 is a cross sectional view of the seat belt guide of FIG. 1.

Referring to FIGS. 1 and 2, the seat belt guide is generally indicated at 10. The guide 10 includes a first wall 16 having opposite top 13 and bottom 15 ends. The first wall 16 extends between generally parallel and spaced apart end walls 12 and 14. The guide 10 also has a second wall 17 having opposite top 21 and bottom 23 ends. The second wall 17 extends between generally parallel and spaced apart side walls 24, 26. The bottom end 15 of the first wall 16 is spaced apart from the top end 21 of the second wall 17 defining a gap or opening therebetween.

The second wall 17 is configured to be coupled to a seat backrest of a vehicle seat. Specifically, the second wall 17 includes a hole allowing the guide 10 to be secured along a back surface of the seat back using screws or other conventional fasteners and/or fastening methods.

The end walls 12, 14 and side walls 24, 26 extend generally orthogonally from the first 16 and second 17 walls, respectively. The end walls 12, 14 and the side walls 24, 26 are spaced apart by a distance slightly wider than the width of a conventional seat belt for retaining the seat belt B therebetween.

Each side wall 24, 26 has a raised portion 18, 19 that extends between the bottom end 15 of the first wall 16 and the top end 21 of the second wall 17. Retaining walls 20, 22 extend toward each other from the raised portion 18, 19 of the respective side walls 24, 26. The retaining walls 20, 22 are substantially coplanar and are generally parallel with the second wall 17. The retaining walls 20, 22 are spaced apart from the second wall 17 by a distance slightly greater than the thickness of a conventional seat belt for retaining the seat belt B therebetween and to prevent twisting of the belt B. The retaining walls 20, 22 are also positioned over the gap defined between the bottom end 15 of the first wall 16 and the top end 21 of the second wall 17 so as to minimize friction associated with the belt B passing under the retaining walls 20, 22.

The retaining walls 20, 22 have distal ends 31, 33 that are generally parallel and spaced apart from each other to allow the belt B to be inserted to an operative position in the guide 10 during assembly of the seat. The distal ends 31, 33 are also positioned close together to prevent the belt B from exiting the guide 10 as it slides therethrough.

A first lip 28 extends along the bottom end 15 of the first wall 16. A second lip 30 extends along the bottom end 23 of the second wall 17. The lips 28, 30 protrude outwardly for keeping the seat belt B spaced apart from the first 16 and second 17 walls, respectively, thereby minimizing friction as the belt B slides through the guide 10.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A seat belt guide for guiding a seat belt of a vehicle seat, said seat belt guide comprising:
   first and second walls each having opposite top and bottom ends;
   a pair of end walls extending from the first wall, the end walls being spaced apart for retaining the seat belt in a transverse direction;
   a pair of side walls extending from the second wall, the side walls being spaced apart for retaining the seat belt in the transverse direction;
   a pair of retaining walls extending toward each other from the pair of side walls, the retaining walls being spaced apart from the second wall for retaining the seat belt therebetween; and
   first and second lips protruding outwardly for maintaining the seat belt spaced apart from the second wall to minimize friction associated with sliding of the seat belt through the guide.

2. A seat belt guide as set forth in claim 1, wherein the bottom end of the first wall and the top end of the second wall are spaced apart to define an opening therebetween.

3. A seat belt guide as set forth in claim 2, wherein the first lip extends along the bottom end of the first wall.

4. A seat belt guide as set forth in claim 3, wherein the second lip extends along the bottom end of the second wall.

5. A seat belt guide as set forth in claim 1, wherein the first and second walls are nonparallel to each other.

6. A seat belt guide as set forth in claim 1, wherein each retaining wall includes a distal end, the distal ends being generally parallel and spaced apart to allow the belt to be inserted therethrough to an operative position in the guide and to prevent the belt from exiting therefrom during use.

7. A seat belt guide for guiding a seat belt of a vehicle seat, said seat belt guide comprising:
   first and second walls spaced apart to define an opening therebetween;
   a par of end walls extending from the first wall, the end walls being spaced apart for retaining the seat belt in a transverse direction;
   a pair of side walls extending from the second wall, the side walls being spaced apart for retaining the seat belt in the transverse direction;
   first and second lips protruding outwardly for maintaining the seat belt spaced apart from the second wall to minimize friction associated with sliding of the seat belt through the guide; and
   a pair of retaining walls extending toward each other from the pair of side walls, the retaining walls being spaced apart from the second wall for retaining the seat belt therebetween,
   wherein the retaining walls extend over the opening.

8. A seat belt guide as set forth in claim 7, wherein the first and second lips are disposed on opposite sides of the opening.

9. A seat belt guide as set forth in claim 8, wherein the second wall is configured to be fixedly secured to the vehicle seat.

10. A seat belt guide for guiding a seat belt of a vehicle seat, said seat belt guide comprising:
    first and second walls each having opposite top and bottom ends, the bottom end of the first wall and the top end of the second wall being spaced apart to define an opening therebetween;
    a pair of end walls extending from the first wall, the end walls being spaced apart for retaining the seat belt in a transverse direction;
    a pair of side walls extending from the second wall, the side walls being spaced apart for retaining the seat belt in the transverse direction; and
    a pair of retaining walls extending toward each other from the pair of side walls, the retaining walls being spaced apart from the second wall for retaining the seat belt therebetween, the retaining walls being positioned over the opening defined between the bottom end of the first wall and the top end of the second wall so as to minimize friction associated with the belt passing under the retaining walls.

11. A seat belt guide as set forth in claim 10, wherein each retaining wall includes a distal end, the distal ends being generally parallel and spaced apart to allow the belt to be inserted therethrough to an operative position in the guide and to prevent the belt from exiting therefrom during use.

12. A seat belt guide as set forth in claim 10 including first and second lips protruding outwardly for maintaining the seat belt spaced apart from the second wall to minimize friction associated with sliding of the seat belt through the guide, the lips being positioned on opposite sides of the opening.

13. A seat belt guide as set forth in claim 12, wherein the second lip extends along the bottom end of the second wall.

14. A seat belt guide as set forth in claim 12, wherein the first lip extends along the bottom end of the first wall.

* * * * *

UNITED STATES PATENT AND TRADEMARK OFFICE
CERTIFICATE OF CORRECTION

PATENT NO. : 7,325,879 B2  
APPLICATION NO. : 11/549163  
DATED : February 5, 2008  
INVENTOR(S) : Masroor Fahim et al.

Page 1 of 1

It is certified that error appears in the above-identified patent and that said Letters Patent is hereby corrected as shown below:

Column 3, Line 42, replace "a par" with --a pair--

Signed and Sealed this

Third Day of June, 2008

JON W. DUDAS  
*Director of the United States Patent and Trademark Office*